Figure 1:
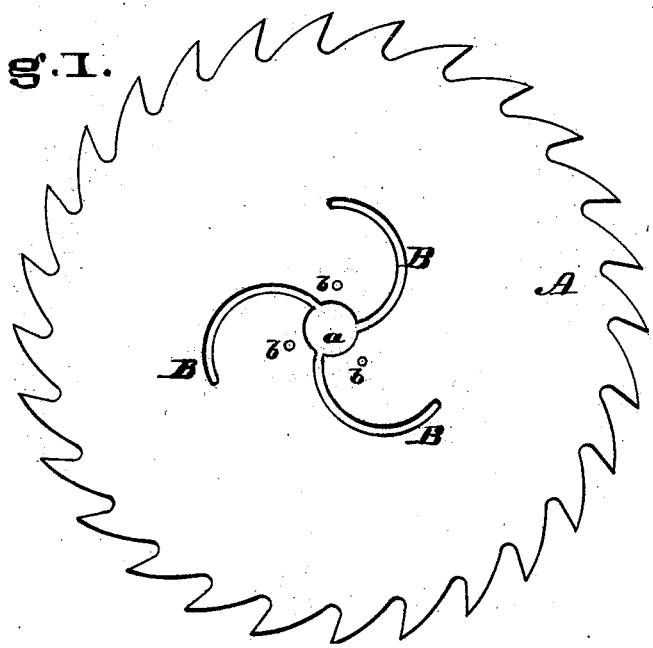

J. F. MILLIGAN.
Circular-Saw.

No. 199,851. Patented Jan. 29, 1878.

WITNESSES.

INVENTOR.

John F. Milligan,
By Chas. D. Moody,
atty.

UNITED STATES PATENT OFFICE.

JOHN F. MILLIGAN, OF ST. LOUIS, MISSOURI, ASSIGNOR TO JOSEPH W. BRANCH, OF SAME PLACE.

IMPROVEMENT IN CIRCULAR SAWS.

Specification forming part of Letters Patent No. 199,851, dated January 29, 1878; application filed February 1, 1876.

*To all whom it may concern:*

Be it known that I, JOHN F. MILLIGAN, a resident of the city and county of St. Louis, State of Missouri, have invented a new and useful Improvement in Circular Saws, of which the following is a full, clear, and exact description, reference being had to the annexed drawing, making part of this specification.

The central part of a circular saw, in use, becomes unduly heated. This causes the saw to assume a dished form, making it difficult, and often impracticable, to operate.

It has heretofore been attempted to overcome this difficulty by introducing a series of slots into the saw-blade, as follows: Extending upon radial lines from the eye of the saw outward toward its periphery.

It has been found in practice that slots extended in the direction described greatly weaken the blade. Moreover, the heated metal can free itself only in a direction at right angles to a diameter of the saw, there being no provision for its expansion in the direction of the periphery of the saw.

It is the aim of the present invention to provide means by which the heated metal is enabled to expand freely in all directions, and without impairing the strength and usefulness of the saw; and it consists in the use of slots of a peculiar character and arrangement, as shown in the annexed drawing, where—

A represents a circular saw having the usual eye $a$ and holes $b\ b\ b$, through which the pins are passed to fasten the saw to the collar. B B B represent a series (two, three, or more) of curved slots. Commencing at the eye $a$, they curve around in the central part of the saw-blade, and so that the outer end of each slot overlaps, or nearly overlaps, the inner end of the next slot.

I do not desire to be limited to any special curvature. But whether of a greater or less radius than that shown, or of a varying radius, it is essential that the axis of the slot be a continuous curve, and that the slots be extended substantially as described, for by this arrangement the heated metal around the eye of the saw can expand freely in all directions, toward the periphery as well as to other points, and, by reason of the peculiar shape of the slots, the blade is not injured.

What I claim is—

1. A circular saw constructed with curved slots B B B in its central portion, as and for the purpose set forth.

2. A circular saw constructed with curved slots B B B extending from the eye, as shown and described, for the purpose set forth.

JOHN F. MILLIGAN.

Witnesses:
CHAS. D. MOODY,
SAML. S. BOYD.